Figure 1:
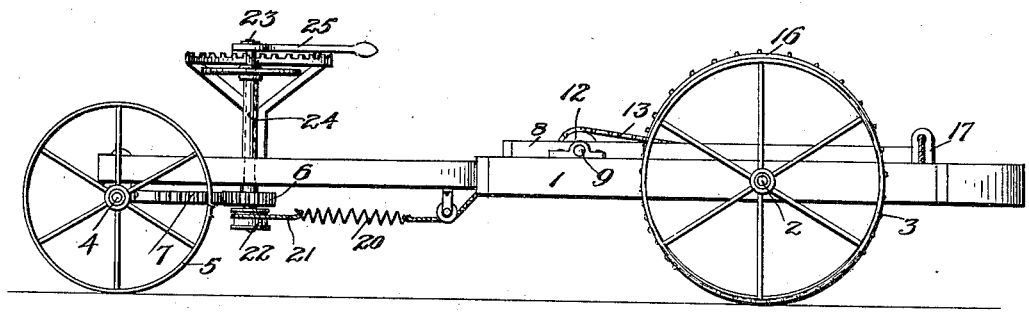

No. 652,669. Patented June 26, 1900.
J. DONOVAN.
AUTOMOBILE VEHICLE.
(Application filed Sept. 6, 1899.)
(No Model.)

Witnesses
Inventor
Jeremiah Donovan
Attorneys

UNITED STATES PATENT OFFICE.

JEREMIAH DONOVAN, OF ESCANABA, MICHIGAN, ASSIGNOR OF ONE-HALF TO ALBERT McKENZIE DONOVAN, OF DETROIT, MICHIGAN.

AUTOMOBILE VEHICLE.

SPECIFICATION forming part of Letters Patent No. 652,669, dated June 26, 1900.

Application filed September 6, 1899. Serial No. 729,582. (No model.)

*To all whom it may concern:*

Be it known that I, JEREMIAH DONOVAN, a subject of the Queen of Great Britain, residing at Escanaba, in the county of Delta and State of Michigan, have invented certain new and useful Improvements in Automobile Vehicles; and I do declare the following to be a full, clear, and exact description of the invention, such as will enable others skilled in the art to which it appertains to make and use the same.

My invention relates to automobiles, and more particularly to that class of traction-motors in which a traction propelling-wheel is supported in the vehicle frame or body independently of the carrying-wheels or other means employed to support the vehicle.

The object of the invention is to provide a traction-propeller which shall be independent of the carrying weight or load of the machine.

To this end the invention consists in the construction, combination, and arrangement of the several elements of the machine, as will be hereinafter more fully described, and particularly pointed out in the claim.

In the accompanying drawings the same reference characters indicate the same parts of the invention.

Figure 2:
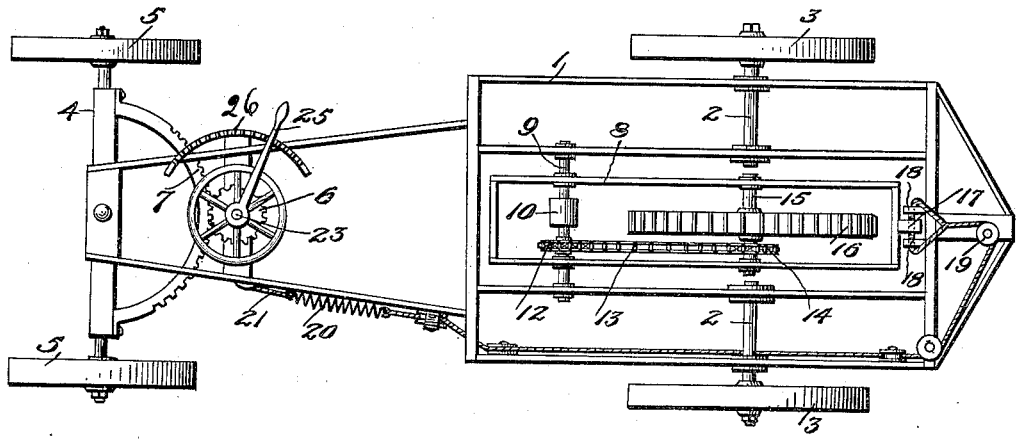

Figure 1 is a side view of an automobile embodying my invention. Fig. 2 is a top plan view of the machine.

1 denotes the frame of the machine, which is provided with the stud-axles 2 2, on which are mounted the carrying-wheels 3 3, and a pivoted axle 4, carrying the steering-wheels 5 5. A pinion 6 is mounted in the frame and is in mesh with a segmental rack 7, fixed to the axle, serving as a medium for guiding the machine, although any other suitable means may be employed for this purpose.

8 denotes a frame fulcrumed at one end on the shaft 9, journaled in the main frame and provided with a gear or pulley 10, to which motion is imparted by a prime motor (not shown) on the vehicle. This shaft 9 also carries a sprocket-wheel 12, from which a sprocket-chain 13 extends to a sprocket-wheel 14, fixed to a counter-shaft 15, journaled near the opposite end of the frame 8, and on this counter-shaft 15 is mounted a traction-wheel 16, which has a bearing on the surface to be traveled over.

The free end of the frame 8 carries an arm 17, which has a vertical movement between the parallel arms of the bracket 18, fixed on the main frame. A rope, of wire or other suitable flexible material, has one looped end fixed in the arm 17, and it then passes through the orificed arms of the bracket 18 and around a grooved pulley 19. Thence it is carried along the main frame over suitable guide-pulleys and is connected to a spiral spring 20, to the opposite end of which a similar rope or a chain 21 is attached, and the latter extends to a hub, drum, or pulley 22, fixed on a shaft 23, extending upward through the sleeve or tubular shaft 24, on which the pinion or steering-gear 6 is mounted. This shaft 23 is provided with a hand wheel or lever 25, which engages a notched rack 26 to retain it in its adjusted position, so that the tension of the spring 20 may be regulated to increase or diminish the traction of the wheel 16.

The traction-wheel will of course in some instances be provided with spurs or the like to attain the requisite traction in soft ground, and in certain instances the carrying-wheels may be replaced by runners in traveling over ice and snow, and when used on a tramway the carrying-wheels will be flanged to prevent them from leaving the track, and in these instances the steering-wheels are fixed for obvious reasons.

It will thus be seen that my invention contemplates a vehicle of the automobile class which can be run on wheels or runners, as occasion may require, and is adapted for use on ordinary roads, on ice or snow, on lake or river, or wherever the ice is sufficiently strong to bear the vehicle and its load. It is the intention to propel other vehicles or other objects that may be attached to it. It is also intended to be applied to agricultural and other vehicles where locomotion is required—in a word, to embrace all that class of vehicles now drawn by horses and a common traction-engine, and with certain modifications of a common nature is also applicable to street-car and railroad lines. It is also intended that the vehicle may be propelled by steam, gas, gasolene, petroleum, compressed air, electrical motors, or any other developed power that may be used for such propulsion, and also by muscular power in the lighter class of vehicles. The construction also contemplates the least possible effective pressure between the driving-wheel and the medium with which it may be in contact, also the mechanism of jolting or jarring while in transit, thus reducing the jarring to that of vehicles drawn by horses. It also contemplates that the carrying-wheels may be replaced by runners, as occasion may require, without interfering with the driving mechanism. It is further contemplated that the driving-wheels or traction-wheel may be so altered or changed from time to time as to always secure adhesion to the medium through which the vehicle is moving.

The accompanying drawings show my invention in the best form now known to me; but many changes in the details might be made within the skill of a good mechanic without departing from the spirit of my invention as set forth in the claim at the end of this specification.

Having thus fully described my invention, what I claim, and desire to secure by Letters Patent of the United States, is—

An automobile, comprising a main frame provided with carrying and steering wheels, or runners; an auxiliary frame fulcrumed in the main frame; a traction-wheel mounted in said auxiliary frame, and shafts 9 and 15, the latter carrying the traction-wheel 16; the sprocket-wheels on the shafts 9 and 15, and the sprocket-chain connecting the same; the segmental rack 7; the notched rack 26; the pinion 6; the lever 25 for operating said pinion 6; the bracket 18 and the pulley 22 on the shaft 23; and the spring 20 forming a part or section of the rope 21, substantially as specified.

In testimony whereof I have hereunto set my hand in presence of two subscribing witnesses.

JEREMIAH DONOVAN.

Witnesses:
 LEWIS MORMON,
 C. D. McEWEN.